United States Patent
Aggarwal et al.

(10) Patent No.: US 7,519,116 B2
(45) Date of Patent: Apr. 14, 2009

(54) TERITARY CONTENT ADDRESSABLE MEMORY BASED MOTION ESTIMATOR

(75) Inventors: Gaurav Aggarwal, Bangalore (IN); Rajendra Khare, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 597 days.

(21) Appl. No.: 10/900,159

(22) Filed: Jul. 27, 2004

(65) Prior Publication Data

US 2006/0023783 A1 Feb. 2, 2006

(51) Int. Cl.
*H04N 7/18* (2006.01)

(52) U.S. Cl. ............................. 375/240.12; 375/240.14; 375/240.25; 375/240.26; 348/716

(58) Field of Classification Search .................. 375/240.01–240.29; 34/700–725
See application file for complete search history.

(56) References Cited

U.S. PATENT DOCUMENTS

| 5,872,600 | A  * | 2/1999 | Suzuki ....................... 348/459 |
| 6,212,237 | B1 * | 4/2001 | Minami et al. .......... 375/240.16 |
| 6,970,509 | B2 * | 11/2005 | Xiang et al. ............ 375/240.16 |
| 2005/0185713 | A1 * | 8/2005 | Winger ................. 375/240.12 |

* cited by examiner

*Primary Examiner*—Andy S Rao
(74) *Attorney, Agent, or Firm*—McAndrews, Held & Malloy Ltd.

(57) ABSTRACT

Presented herein are Tertiary Content Addressable Memory based motion estimator(s). In one embodiment, there is presented a method for encoding a picture. The method comprises storing a reference picture in a memory; taking samples from at least one line of a prediction block; generating at least one data word, the data word being a function of the samples; addressing the memory with the at least one data word; receiving one or more addresses, said one or more addresses associated with one or more blocks; and selecting a reference block from the one or more blocks for the prediction block.

17 Claims, 6 Drawing Sheets

10R

10P

| 0,0 | 0,1 | 0,2 | 0,3 | 0,4 | 0,5 | 0,6 | 0,7 | 0,8 | 0,9 | 0,10 | 0,11 | 0,12 | 0,13 | 0,14 | 0,15 |
|---|---|---|---|---|---|---|---|---|---|---|---|---|---|---|---|
| 1,0 | 1,1 | 1,2 | 1,3 | 1,4 | 1,5 | 1,6 | 1,7 | 1,8 | 1,9 | 1,10 | 1,11 | 1,12 | 1,13 | 1,14 | 1,15 |
| 2,0 | 2,1 | 2,2 | 2,3 | 2,4 | 2,5 | 2,6 | 2,7 | 2,8 | 2,9 | 2,10 | 2,11 | 2,12 | 2,13 | 2,14 | 2,15 |
| 3,0 | 3,1 | 3,2 | 3,3 | 3,4 | 3,5 | 3,6 | 3,7 | 3,8 | 3,9 | 3,10 | 3,11 | 3,12 | 3,13 | 3,14 | 3,15 |
| 4,0 | 4,1 | 4,2 | 4,3 | 4,4 | 4,5 | 4,6 | 4,7 | 4,8 | 4,9 | 4,10 | 4,11 | 4,12 | 4,13 | 4,14 | 4,15 |
| 5,0 | 5,1 | 5,2 | 5,3 | 5,4 | 5,5 | 5,6 | 5,7 | 5,8 | 5,9 | 5,10 | 5,11 | 5,12 | 5,13 | 5,14 | 5,15 |
| 6,0 | 6,1 | 6,2 | 6,3 | 6,4 | 6,5 | 6,6 | 6,7 | 6,8 | 6,9 | 6,10 | 6,11 | 6,12 | 6,13 | 6,14 | 6,15 |
| 7,0 | 7,1 | 7,2 | 7,3 | 7,4 | 7,5 | 7,6 | 7,7 | 7,8 | 7,9 | 7,10 | 7,11 | 7,12 | 7,13 | 7,14 | 7,15 |
| 8,0 | 8,1 | 8,2 | 8,3 | 8,4 | 8,5 | 8,6 | 8,7 | 8,8 | 8,9 | 8,10 | 8,11 | 8,12 | 8,13 | 8,14 | 8,15 |
| 9,0 | 9,1 | 9,2 | 9,3 | 9,4 | 9,5 | 9,6 | 9,7 | 9,8 | 9,9 | 9,10 | 9,11 | 9,12 | 9,13 | 9,14 | 9,15 |
| 10,0 | 10,1 | 10,2 | 10,3 | 10,4 | 10,5 | 10,6 | 10,7 | 10,8 | 10,9 | 10,10 | 10,11 | 10,12 | 10,13 | 10,14 | 10,15 |
| 11,0 | 11,1 | 11,2 | 11,3 | 11,4 | 11,5 | 11,6 | 11,7 | 11,8 | 11,9 | 11,10 | 11,11 | 11,12 | 11,13 | 11,14 | 11,15 |
| 12,0 | 12,1 | 12,2 | 12,3 | 12,4 | 12,5 | 12,6 | 12,7 | 12,8 | 12,9 | 12,10 | 12,11 | 12,12 | 12,13 | 12,14 | 12,15 |
| 13,0 | 13,1 | 13,2 | 13,3 | 13,4 | 13,5 | 13,6 | 13,7 | 13,8 | 13,9 | 13,10 | 13,11 | 13,12 | 13,13 | 13,14 | 13,15 |
| 14,0 | 14,1 | 14,2 | 14,3 | 14,4 | 14,5 | 14,6 | 14,7 | 14,8 | 14,9 | 14,10 | 14,11 | 14,12 | 14,13 | 14,14 | 14,15 |
| 15,0 | 15,1 | 15,2 | 15,3 | 15,4 | 15,5 | 15,6 | 15,7 | 15,8 | 15,9 | 15,10 | 15,11 | 15,12 | 15,13 | 15,14 | 15,15 |

120

| | | | | |
|---|---|---|---|---|
| 510(0) | 120(0,0) | 120(0,4) | 120(0,8) | 120(0,12) |
| 510(1) | 120(4,0) | 120(4,4) | 120(4,8) | 120(4,12) |
| 510(2) | 120(8,0) | 120(8,4) | 120(8,8) | 120(8,12) |
| 510(3) | 120(12,0) | 120(12,4) | 120(12,8) | 120(12,12) |

| | | | | |
|---|---|---|---|---|
| 505(0) | 120(0,0) XXXX | 120(0,4) XXXX | 120(0,8) XXXX | 120(0,12) XXXX |
| 505(1) | 120(4,0) XXXX | 120(4,4) XXXX | 120(4,8) XXXX | 120(4,12) XXXX |
| 505(2) | 120(8,0) XXXX | 120(8,4) XXXX | 120(8,8) XXXX | 120(8,12) XXXX |
| 505(3) | 120(12,0) XXXX | 120(12,4) XXXX | 120(12,8) XXXX | 120(12,12) XXXX |

| 0,0 | 0,1 | 0,2 | 0,3 | 0,4 | 0,5 | 0,6 | ...... |
|-----|-----|-----|-----|-----|-----|-----|--------|
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| 1,0 | 1,1 | 1,2 | 1,3 | 1,4 | 1,5 | 1,6 | ...... |
| :   | :   | :   | :   | :   | :   | :   | :      |

| 0,0 | 0,4 | 0,8 | 0,12 | 0,16 | 0,20 | 0,24 | ...... |
|-----|-----|-----|------|------|------|------|--------|
| 4,0 | 4,4 | 4,8 | 4,12 | 4,16 | 4,20 | 4,24 | ...... |
| :   | :   | :   | :    | :    | :    | :    | :      |

| 0,1 | 0,5 | 0,9 | 0,11 | 0,15 | 0,21 | 0,25 | ...... |
|-----|-----|-----|------|------|------|------|--------|
| 4,1 | 4,5 | 4,9 | 4,11 | 4,15 | 4,21 | 4,25 | ...... |
| :   | :   | :   | :    | :    | :    | :    | :      |

:
:

| 1,0 | 1,4 | 1,8 | 1,12 | 1,16 | 1,20 | 1,24 | ...... |
|-----|-----|-----|------|------|------|------|--------|
| 5,0 | 5,4 | 5,8 | 5,12 | 5,16 | 5,20 | 5,24 | ...... |
| :   | :   | :   | :    | :    | :    | :    | :      |

| 1,1 | 1,5 | 1,9 | 1,11 | 1,15 | 1,21 | 1,25 | ...... |
|-----|-----|-----|------|------|------|------|--------|
| 5,1 | 5,5 | 5,9 | 5,11 | 5,15 | 5,21 | 5,25 | ...... |
| :   | :   | :   | :    | :    | :    | :    | :      |

TERITARY CONTENT ADDRESSABLE MEMORY BASED MOTION ESTIMATOR

RELATED APPLICATIONS

This application is related to the following applications:
(1) "Tertiary Content Addressable Memory Based Motion Estimator" a non-provisional application for U.S. patent Ser. No. 10/909,151, filed Jul. 30, 2004 by Gaurav Aggarwal, et al.
(2) "Tertiary Content Addressable Memory Based Motion Estimator," a non-provisional application for U.S. patent Ser. No. 10/903,664, filed Jul. 30, 2004 by Gaurav Aggarwal, et al.
Each of which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video encoding standards such as MPEG-2, ITU-H.264 (also known as MPEG-4, Part 10 and Advanced Video Coding) use motion compensation for compressing video data comprising a series of pictures. Motion compensation predicts a predicted picture from one or more reference pictures.

An encoder predicts a predicted picture by dividing the picture into smaller blocks of pixels. The encoder then searches pixels from the reference picture(s) for a similar block, known as a reference block. An identification of the reference block and the difference between the reference block and the predicted block, known as the prediction error, represent the predicted block.

Identification of the similar block in the reference picture is known as motion estimation. A memory stores the reference picture. The motion estimator searches the memory for a block that is similar to the reference block.

Motion estimation can potentially use a very large number of memory accesses for determining a reference picture. A high definition television (HDTV) video comprises 30 1920× 1080 pixel pictures per second. A common block size can be, for example, a 16×16 block of pixels, Therefore, an exhaustive search may not be practical, especially for encoding in real time.

In one approach, the encoder may take a smaller number of samples of the block that are preferably sparsely scattered about the block. The motion estimator can then search the reference picture for the samples of the block. Although the foregoing may be faster than an exhaustive search, this can also be time-consuming and computationally intense.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Presented herein are Tertiary Content Addressable Memory based motion estimator(s).

In one embodiment, there is presented a method for encoding a picture. The method comprises storing a reference picture in a memory; taking samples from at least one line of a prediction block; generating at least one data word, the data word being a function of the samples; addressing the memory with the at least one data word; receiving one or more addresses, said one or more addresses associated with one or more blocks; and selecting a reference block from the one or more blocks for the prediction block.

In another embodiment, there is presented a video encoder for encoding a picture. The video encoder comprises a memory, a sampler, a register, a bus, and a comparator. The memory stores a reference picture. The sampler takes samples from at least one line of a prediction block. The register generates at least one data word, the data word being a function of the samples. The bus addresses the memory with the at least one data word and provides one or more addresses, the one or more addresses associated with one or more blocks. The comparator selects a reference block from the one or more blocks for the prediction block.

These and other advantages, aspects and novel features of the present invention, as well as details of illustrative aspects thereof, will be more fully understood from the following description and drawings.

BRIEF DESCRIPTION OF SEVERAL VIEWS OF THE DRAWINGS

FIG. 5 is a block diagram describing an exemplary reference picture stored in a memory in accordance with an embodiment of the present invention;
and
FIG. 6 is a block diagram of an exemplary video encoder in accordance with an embodiment of the present invention.

DETAILED DESCRIPTION OF THE INVENTION

Figure 1:
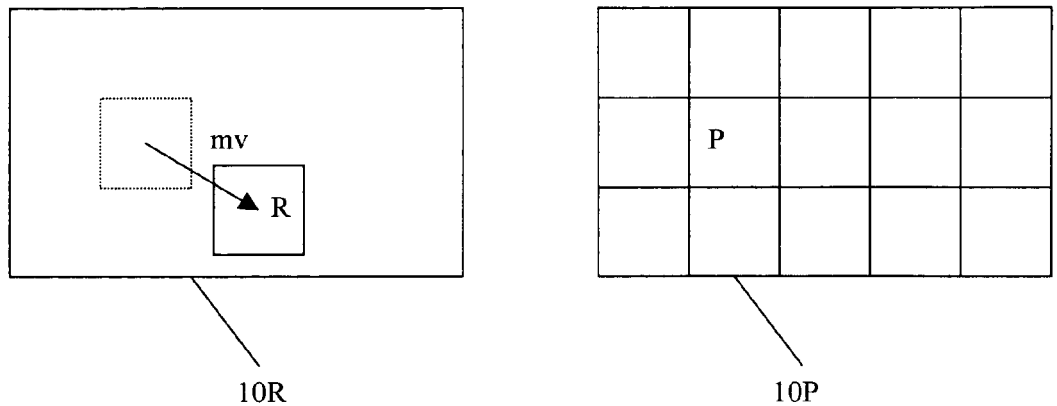
FIG. 1 is a block diagram of exemplary pictures.

Referring now to FIG. 1, there is illustrated an exemplary prediction picture 10P and reference picture 10R. Video data comprises a series of pictures 10 that are captured at short time intervals, such as $\frac{1}{24}$ sec, or $\frac{1}{30}$ sec. When the pictures 10 are displayed on a display device at similar time intervals, the pictures simulate motion picture.

Motion compensation is a technique for encoding video data. Motion compensation takes advantage of the fact that pictures taken during proximate times, e.g., prediction picture P and reference picture R, are likely to contain many similarities. Moreover, the differences between the pictures are likely to be due to displacement of objects within the pictures.

Therefore, a picture, known as a prediction picture 10P, can be divided into blocks P, known as prediction blocks. The prediction blocks P can be encoded as a prediction error E. The prediction error E is a block that when added to a reference block R, yield the prediction block P. Where the reference block R and the prediction block P are similar, the prediction error E can either be nil, or small. Generally, smaller prediction errors require less data. Therefore, it is preferable to find a reference block R that is similar to the prediction block P.

Accordingly, the reference picture 10R is searched for blocks that are similar to blocks P. A reference block R is selected, and the prediction block P is represented by an identifier that identifies the reference block R and the prediction error E. The reference block is identified by a motion vector mv. A motion vector mv describes the displacement between the prediction block P and the reference block R. Finding the reference block R in the reference picture 10R is known as motion estimation.

Figure 2:
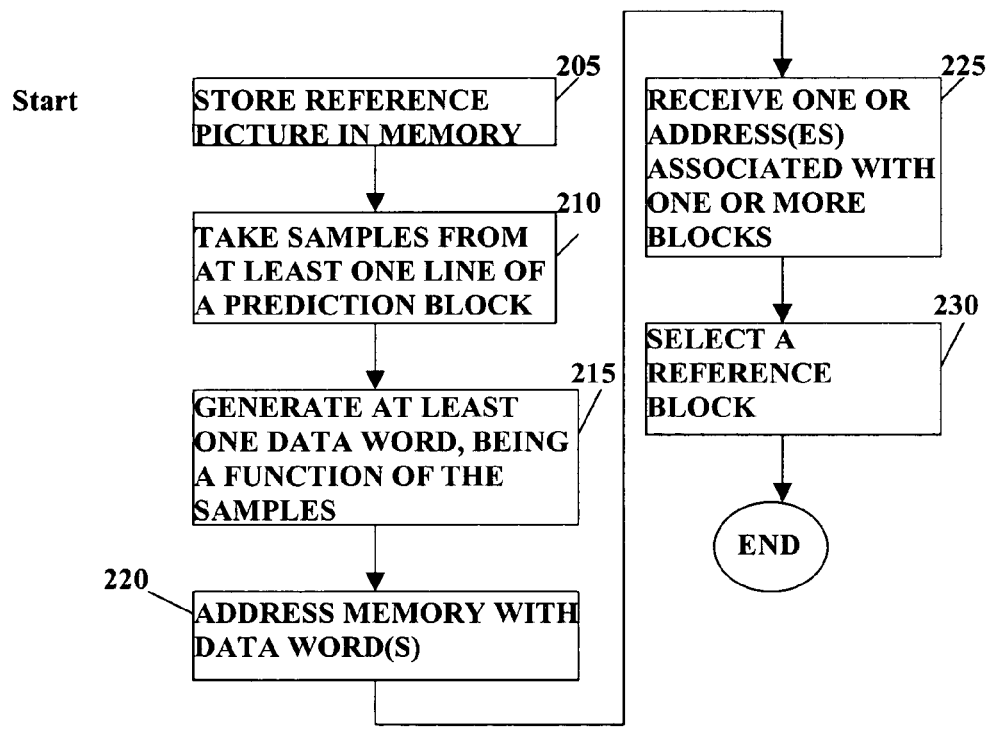
FIG. 2 is a flow diagram for encoding pictures in accordance with an embodiment of the present invention.

Referring now to FIG. 2, there is illustrated a flow diagram for encoding video data in accordance with an embodiment of the present invention. At 205, a reference picture is stored in a memory. The memory can comprise, for example, a content addressable memory (CAM) or a tertiary CAM (TCAM).

At 210, samples are taken from one or more lines of the prediction block P. The prediction block comprises portions of a plurality of lines of the luma, chroma red, and chroma blue pixels of the pictures. In one embodiment, sampling the portion of the line can include selecting pixels at intervals from the portion, the intervals having a certain period, T.

At 215, data word(s) are generated that are a function of the samples during 210. Each of the pixel samples include most significant bits and least significant bits. In one embodiment, a data word can be generated for each particular one of the one or more lines by concatenating the pixel samples from the particular line and replacing the least significant bits with what are known as "don't cares" X.

"Don't cares" indicate that the bits can either be a one "1" or zero "0". At 220, the data word(s) are used to address the memory. Responsive thereto, the memory will return the starting addresses from wherever the data word is stored that are received at 225. Blocks can be formed starting from the starting addresses. These blocks are potential reference blocks for the prediction block P.

At 230, one of the potential reference blocks is selected for the prediction block. In one embodiment of the invention, a sum of squares can be calculated for each potential reference block by taking the square of the difference of each corresponding pair of pixels between the potential reference block and the prediction block. The potential reference block with the least sum of squares can be selected as the reference block. Additionally, in some embodiments of the invention, the another reference block can be selected for another prediction block while sampling.

Figure 3:
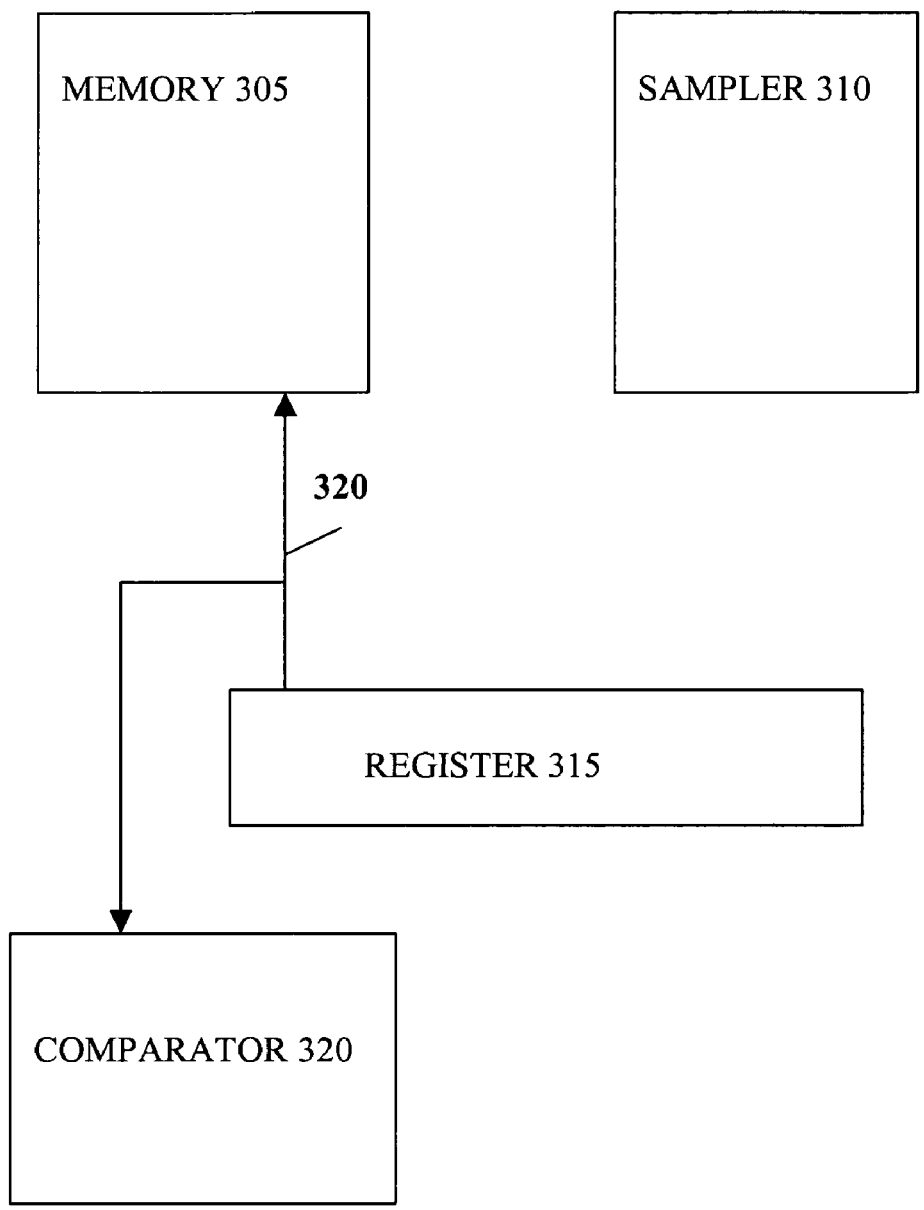
FIG. 3 is a block diagram of an exemplary video encoder in accordance with an embodiment of the present invention.

Referring now to FIG. 3, there is illustrated a block diagram describing an exemplary video encoder 300 in accordance with an embodiment of the present invention. The video encoder 300 comprises a memory 305, a sampler 310, a register 315, a bus 320, and a comparator 325.

The memory 305 stores a reference picture. The memory can comprise, for example, a content addressable memory (CAM) or a tertiary CAM (TCAM). The sampler 310 takes samples from one or more lines of a prediction block P. The prediction block comprises portions of a plurality of lines of the luma, chroma red, and chroma blue pixels of the pictures. In one embodiment, the sampler 310 selects pixels at intervals from the one or more lines, the intervals having a certain period, T.

The register 315 generates data word(s) that are a function of the samples taken by the sampler 310. Each of the pixel samples taken by the sampler 310 include most significant bits and least significant bits. In one embodiment, the register 315 generates data words for each particular one of the one or more lines by concatenating the pixel samples from the particular line and replacing the least significant bits with what are known as "don't cares" X.

"Don't cares" indicate that the bits can either be a one "1" or zero "0". The bus 320 uses the data word(s) generated by register 315 to address the memory returns one or more addresses. The one or more addresses can be starting addresses from wherever the data word(s) are stored. Blocks can be formed starting from the addresses. These blocks are potential reference blocks for the prediction block P.

A comparator 325 compares the potential reference blocks to the prediction block P and selects one of the potential reference blocks for the prediction block. According to one aspect of the invention, a sum of squares is calculated for each potential reference block by taking the square of the difference of each corresponding pair of pixels between the potential reference block and the prediction block. The potential reference block with the least sum of squares can be selected as the reference block. Additionally, in some embodiments of the invention, the comparator can select for another reference block for another prediction block while the sampler samples the one or more lines of the prediction block, in a pipeline fashion.

Embodiments of the present invention will now be explained in the context of the MPEG-2 and H.264 standards. Of course, it shall be understood that the invention is not limited to these standards, and can be applied to other standards as well.

MPEG-2, H.264

Figure 4:
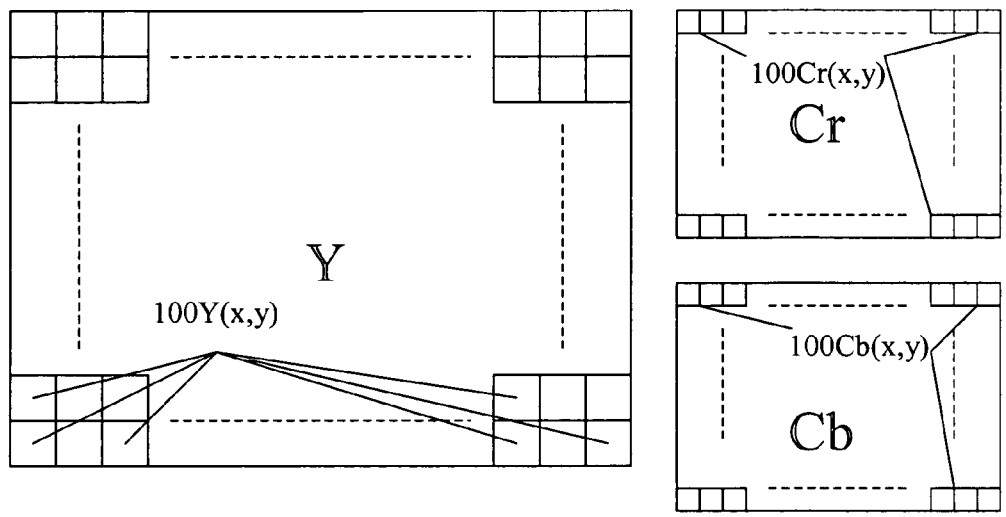
FIG. 4 is a block diagram describing the generation of a data word in accordance with an embodiment of the present invention.
Figure 4:
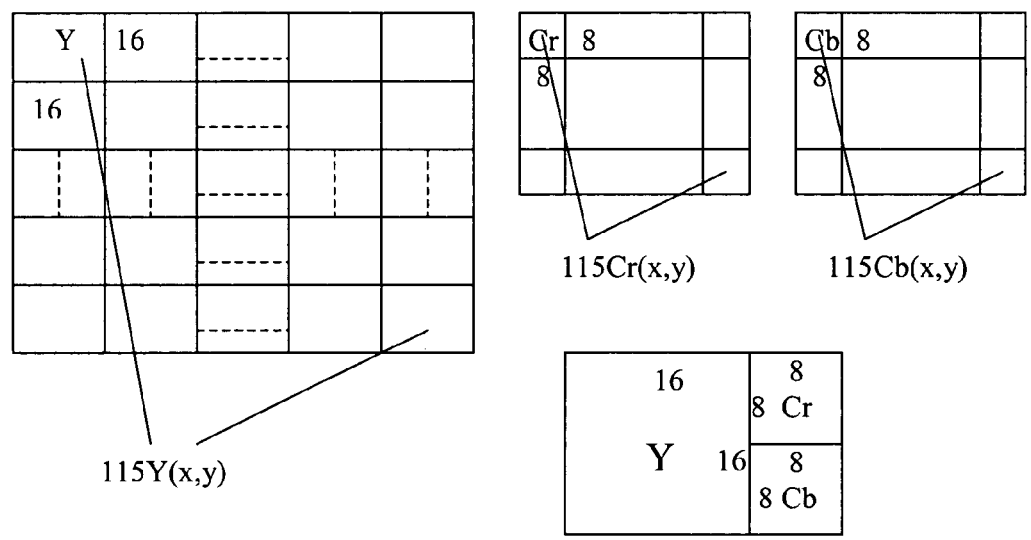

Referring now to FIG. 4, there is illustrated a block diagram of a picture 100. A video camera captures pictures 100 from a field of view during time periods known as frame durations. The successive pictures 100 form a video sequence. A picture 100 comprises two-dimensional grid(s) of pixels $100(x,y)$.

For color video, each color component is associated with a two-dimensional grid of pixels. For example, a video can include a luma, chroma red, and chroma blue components. Accordingly, the luma, chroma red, and chroma blue components are associated with a two-dimensional grid of pixels $100Y(x,y)$, $100Cr(x,y)$, and $100Cb(x,y)$, respectively. When the grids of two dimensional pixels $100Y(x,y)$, $100Cr(x,y)$, and $100Cb(x,y)$ from the frame are overlayed on a display device, the result is a picture of the field of view at the frame duration that the frame was captured.

Generally, the human eye is more perceptive to the luma characteristics of video, compared to the chroma red and chroma blue characteristics. Accordingly, there are more pixels in the grid of luma pixels $100Y(x,y)$ compared to the grids of chroma red $100Cr(x,y)$ and chroma blue $100Cb(x,y)$. In the MPEG 4:2:0 standard, the grids of chroma red $100Cr(x,y)$ and chroma blue pixels $100Cb(x,y)$ have half as many pixels as the grid of luma pixels $100Y(x,y)$ in each direction.

The chroma red $100Cr(x,y)$ and chroma blue $100Cb(x,y)$ pixels are overlayed the luma pixels in each even-numbered column $100Y(x, 2y)$ between each even, one-half a pixel below each even-numbered line $100Y(2x, y)$. In other words, the chroma red and chroma blue pixels $100Cr(x,y)$ and $100Cb(x,y)$ are overlayed pixels $100Y(2x+\frac{1}{2}, 2y)$.

Encoding standards, such as MPEG-2 and ITU-H.264 (also known as MPEG-4, Part 10, and Advanced Video Coding, and now referred to as H.264) use motion compensation to encode and compress video data. Motion compensation divides the picture 100 into blocks, and encodes the blocks on the basis of a similar block that was previously encoded, known as a reference block.

For example, MPEG-2 uses what are known as macroblocks. The luma pixels of the frame $100Y(x,y)$, or top/bottom fields $110YT/B(x,y)$ can be divided into 16×16 pixel $100Y$ (16x->16x+15, 16y->16y+15) blocks $115Y(x,y)$. For each block of luma pixels $115Y(x,y)$, there is a corresponding 8×8 block of chroma red pixels $115Cr(x,y)$ and chroma blue pixels $115Cb(x,y)$ comprising the chroma red and chroma blue pixels that are to be overlayed the block of luma pixels $115Y(x,y)$. A block of luma pixels $115Y(x,y)$, and the corresponding blocks of chroma red pixels $115Cr(x,y)$ and chroma blue pixels 115Cb(x,y) are collectively known as a macroblock 120. In H.264, the macroblocks 120 can be further divided into 16×8, 8×16, 8×8, 4×8, 8×4, and 4×4 blocks 130.

In MPEG-2, each macroblock 120, is compared to the pixels of other pictures for a similar block of pixels P. In H.264, each block 130 is compared to the pixels of other pictures for a similar block of pixels R. The similar block of pixels is known as the reference block R. The difference between the macroblock 120 or block 130 and the reference block R is known as the prediction error E. The prediction error E is calculated and encoded, along with an identification of the reference block R. The reference block R is identified by motion vectors MV. Motion vectors MV describe the spatial displacement between the macroblock 120 or block 130 and the reference block R.

In MPEG-2 and H.264, the prediction error E is transformed to the frequency domain, and quantized. A minimal prediction error E is preferable because it takes fewer bits to encode. Accordingly, it is preferable that the reference block R and the macroblock 120 or block 130 are similar.

Motion Estimation for MPEG-2 and H.264

Referring now to FIG. 5, there is illustrated a block diagram describing data words 505 in accordance with an embodiment of the present invention. The data words 505 are a function of samples taken from a prediction block P.

In the present example, the prediction block P is a macroblock 120 comprising 16×16 pixels. The prediction block P is sampled by selecting every fourth pixel in the horizontal direction and every fourth pixel in the vertical direction. Accordingly, the samples include:

120(0, 0), 120(0, 4), 120(0, 8), 120(0, 12)
120(4, 0), 120(4, 4), 120(4, 8), 120(4, 12)
120(8, 0), 120(8, 4), 120(8, 8), 120(8, 12)
120(12,0), 120(12,4), 120(12,8), 120(12,12)

For each sampled line, 0, 4, 8, 12, the samples are concatenated, forming concatenated words 510(0), 510(1), 510(2), and 510(3). Each pixel is coded with a byte or eight bits. In the concatenated words 510, the four least significant bits for each concatenated sample are replaced with "don't cares", X, thereby forming the data words 505(0), 505(1), 505(2), and 505(3).

Referring now to FIG. 6, there is illustrated a block diagram describing a reference picture stored in memory in accordance with an embodiment of the present invention. The memory is preferably, but not limited to, a TCAM memory. As noted above, the reference picture comprises luma, chroma red, and chroma blue components are associated with a two-dimensional grid of pixels 100Y(x,y), 100Cr(x,y), and 100Cb(x,y), respectively.

The luma pixels 100Y(x,y) from the reference picture are stored in a memory, such that each pixel is stored in memory consecutively with the fourth pixel in the horizontal direction, 100Y(x, y+4), where n=0, 1, 2, 3, . . . . The lines of luma pixels are stored in the memory, in an order every line 100Y (x, - - -) is stored following the fourth line above it 100Y(x−4, y). Accordingly, there will be sixteen sets of pixels, the pixels beginning from 100Y(0,0), . . . 100Y(0,3), 100Y(3,0), . . . 100Y(3,3).

Additionally, the byte address of a line 100Y(x, y) is offset from the byte address of the next line in the order, 100Y(x+4, y) by an integer power of two. For example, where the reference picture is a high definition television (HDTV) picture, there are 1920 pixels in the horizontal direction. Accordingly, there will be 480 pixels in each line in a set. Therefore, the starting address of a line 100Y(x, - - -) and the subsequently stored line 100Y(x+4, - - -) can be offset by 512 bytes.

The data words 505(0), 505(1), 505(2), 505(3) are used to address the memory. Where the content of the memory matches the data words 505, the memory returns the starting byte addresses where the matching data word is stored.

The starting byte addresses returned for data word 505(0) indicates that line 0 of a block in the reference picture has pixels that are similar to the samples in the first line of the prediction block P.

The starting byte addresses returned for data word 505(1) indicates that line 4 of a block in the reference picture has pixels that are similar to the samples in the first line of the prediction block P.

The starting byte addresses returned for data word 505(2) indicates that line 8 of a block in the reference picture has pixels that are similar to the samples in the first line of the prediction block P.

The starting byte addresses returned for data word 505(3) indicates that line 12 of a block in the reference picture has pixels that are similar to the samples in the first line of the prediction block P.

As noted above, the byte address of a line 100Y(x, y) is offset from the byte address of the next line in the order, 100Y(x+4, y) by an integer power of two. Therefore, for each set of four addresses among the starting addresses returned for 505(0), 505(1), 505(2), and 505(3), where each are sequentially offset from each other by the integer power of two (i.e., the integer number of least significant bits are the same), the address for 505(0) is the starting address for a block that has pixels that are similar to all of the samples from the prediction block. The foregoing is a potential reference block.

Each potential reference block PR is reconstructed from the memory and compared to the prediction block P. Each pixel of each potential reference block PR(0,0) . . . PR(15,15) is compared to the corresponding pixel in the prediction block P(0,0) . . . P(15,15). The sum of the differences between each corresponding pixel, $(PR(0,0)-P(0,0))^2 + \ldots + (PR(15,15)-P(15,15))^2$ is calculated for each potential reference block PR. The potential reference block with the lowest sum of differences is selected as the reference block R.

Figure 7:
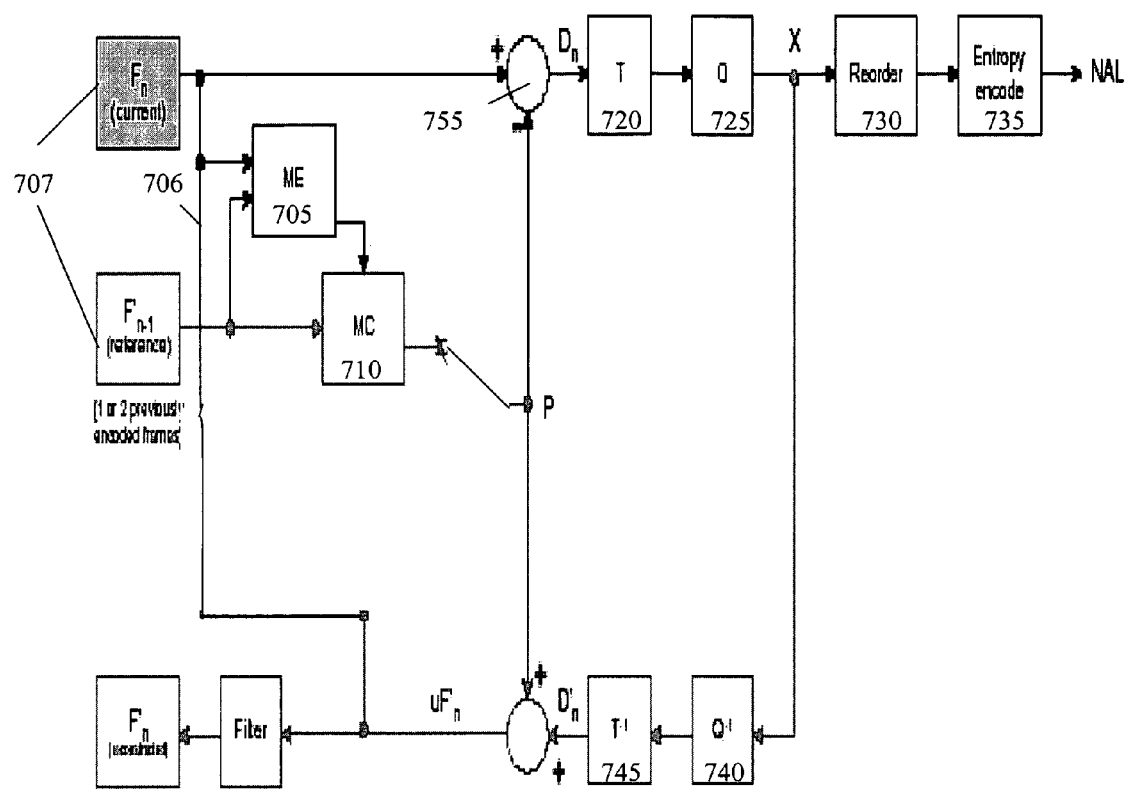

Referring now to FIG. 7, there is illustrated a block diagram describing an exemplary video encoder in accordance with an embodiment of the present invention. The video encoder encodes video data and comprises a motion estimator 705, a bus 706, TCAM memory 707, motion compensator 710, spatial predictor 715, transformation engine 720, quantizer 725, scanner 730, entropy encoder 735, inverse quantizer 740, and inverse transformation engine 745. The motion estimator 705, motion compensator 710, spatial predictor 715, transformation engine 720, quantizer 725, scanner 730, entropy encoder 735, inverse quantizer 740, and inverse transformation engine 745 can comprise hardware accelerator units under the control of a CPU.

When an input picture $100_n$ is presented for encoding, the video encoder processes the picture $100_n$ in units of macroblocks 120 or blocks 130. The video encoder can encode each macroblock 120 or block 130 using temporal prediction. The motion estimator 705 and motion compensator 710 select a reference block R from one or more reference frames. Additionally, the motion estimator 705 and motion compensator 710 provide motion vectors identifying the reference block.

A subtractor 755 subtracts the prediction block P from the macroblock 120 or block 130 in frame $F_n$, resulting in a prediction error E. Transformation engine 720 and quantizer 725 block transform and quantize the prediction error E, resulting in a set of quantized transform coefficients X. The scanner 730 reorders the quantized transform coefficients X. The entropy encoder 735 entropy encodes the coefficients. The video encoder also decodes the quantized transform coefficients X, via inverse transformation engine 745, and inverse quantizer 740, in order to reconstruct the frame $F_n$ for encoding later other frames.

According to certain aspects of the present invention, the motion estimator 705 can comprise a sampler, register, and comparator as shown in FIG. 3. Additionally, in one embodiment of the present invention, the video encoder can operate as shown in FIG. 2.

The degree of integration of the encoder system will primarily be determined by the speed and cost considerations. Because of the sophisticated nature of modern processor, it is possible to utilize a commercially available processor, which may be implemented external to an ASIC implementation. If the processor is available as an ASIC core or logic block, then the commercially available processor can be implemented as part of an ASIC device wherein certain functions can be implemented in firmware. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope.

Therefore, it is intended that the present invention not be limited to the particular embodiment disclosed, but that the present invention will include all embodiments falling within the scope of the appended claims.

The invention claimed is:

1. A method for encoding a picture, said method comprising:
   storing a reference picture in a memory;
   taking samples from at least one line of a prediction block;
   generating at least one data word, the data word being a function of the samples;
   addressing the memory with the at least one data word;
   receiving one or more addresses, said one or more addresses associated with one or more blocks; and
   selecting a reference block from the one or more blocks for the prediction block.

2. The method of claim 1, wherein sampling further comprises:
   selecting pixels at intervals from the one or more lines, said intervals having a certain period.

3. The method of claim 2, wherein storing the picture in the memory further comprises:
   storing pixels from one or more lines of the reference picture, such that pixels at intervals having the certain period are stored consecutively in the memory.

4. The method of claim 2, wherein each of the samples comprises a plurality of bits, the plurality of bits comprising most significant bits and least significant bits, wherein generating the data word further comprises:
   concatenating the samples; and
   replacing the least significant bits of the samples with "don't cares".

5. The method of claim 1, wherein selecting the reference block further comprises:
   comparing each of the one or more blocks to the prediction block.

6. The method of claim 5, wherein comparing each of the one or more blocks to the prediction block further comprises calculating a sum of squares for each of the one or more blocks, and wherein selecting the reference block further comprises selecting a particular one of the blocks, the particular one of the blocks having a lowest some of squares.

7. The method of claim 1, further comprising:
   selecting another reference block for another prediction block, while taking the samples.

8. A video encoder for encoding a picture, said video encoder comprising:
   a memory for storing a reference picture;
   a sampler for taking samples from at least one line of a prediction block;
   a register for generating at least one data word, the data word being a function of the samples;
   a bus for addressing the memory with the at least one data word and providing one or more addresses, said one or more addresses associated with one or more blocks; and
   a comparator for selecting a reference block from the one or more blocks for the prediction block.

9. The video encoder of claim 8, wherein the sampler selects pixels at intervals from the one or more lines, said intervals having a certain period.

10. The video encoder of claim 9, wherein the memory stores pixels from one or more lines of the reference picture, such that pixel at intervals having the certain period are stored consecutively in the memory.

11. The video encoder of claim 9, wherein each of the samples comprises a plurality of bits, the plurality of bits comprising most significant bits and least significant bits, wherein the register concatenates the samples and replaces the least significant bits of the samples with "don't care" indicators.

12. The video encoder of claim 8, wherein the comparator compares each of the one or more blocks to the prediction block.

13. The video encoder of claim 12, wherein the comparator calculates a sum of squares for each of the one or more blocks, and wherein selecting the reference block further comprises selecting a particular one of the blocks, the particular one of the blocks having a lowest some of squares.

14. The video encoder of claim 8, wherein the encoder selects another reference block for another prediction block, while the sampler takes the samples.

15. A video encoder for encoding a picture, said video encoder comprising:
   a memory for storing a reference picture;
   a sampler for taking pixel samples from at least one line of a prediction block;
   a register for generating at least one data word, the data word being a function of the pixel samples;
   a bus for addressing the memory using the at least one data word that is a function of the pixel samples and providing one or more addresses, said one or more addresses associated with one or more blocks; and
   a comparator for selecting a reference block from the one or more blocks for the prediction block.

16. The video encoder of claim 15, wherein the bus uses the at least one data word that is a function of the pixel samples as an argument during a memory read request.

17. The video encoder of claim 16, wherein the bus uses the at least one data word that is a function of the pixel samples as an address argument during a memory read request.

* * * * *